June 2, 1942.   A. COLOMBO   2,285,018
SILENT TYPEWRITING MACHINE
Filed April 22, 1938   5 Sheets-Sheet 1
Fig. 1.
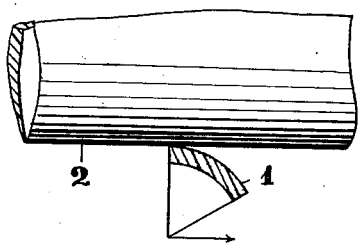
Fig. 2.
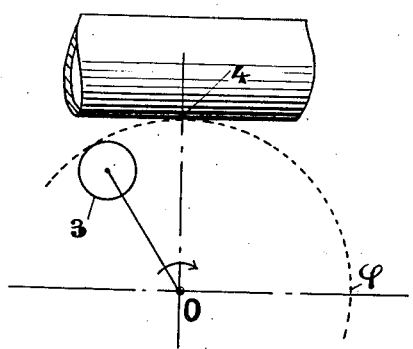
Fig. 3.
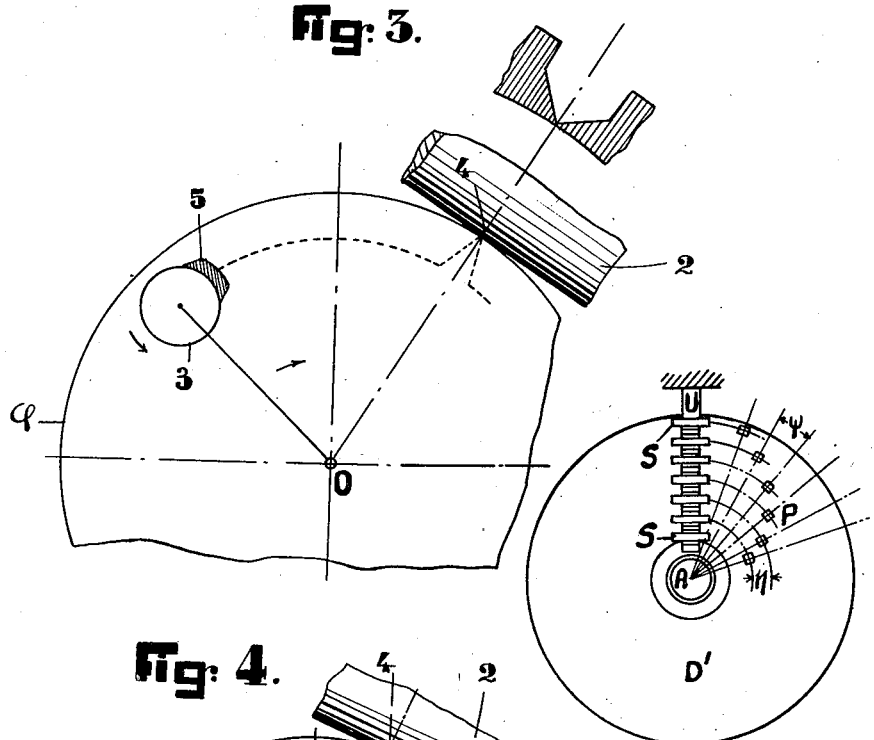
Fig. 4.
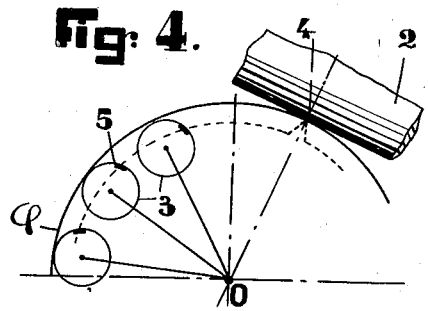
Fig. 14.
Achille Colombo
Inventor
By Haseltine, Lake & Co
Attorneys.

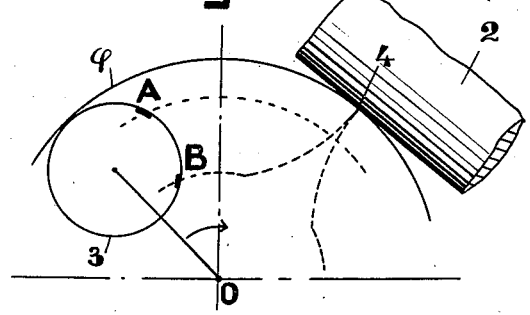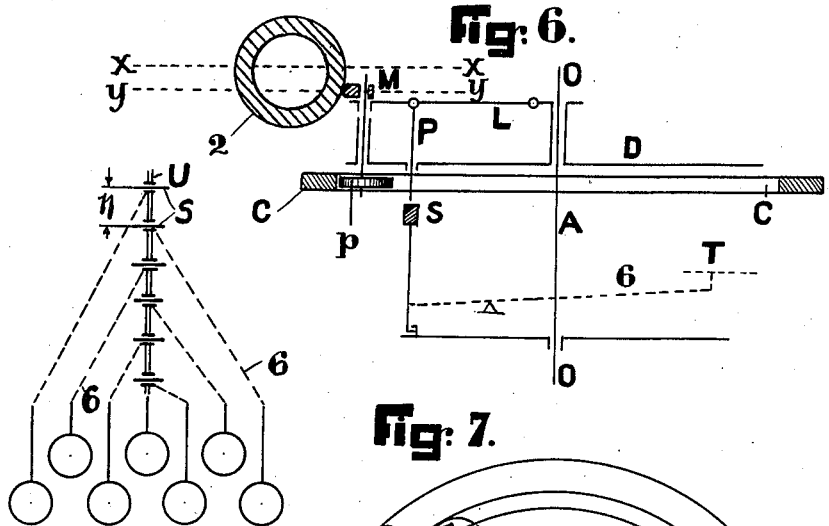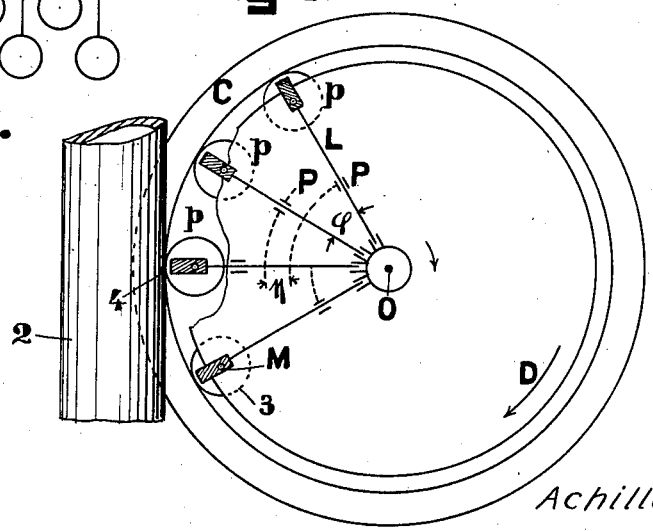

June 2, 1942. A. COLOMBO 2,285,018
SILENT TYPEWRITING MACHINE
Filed April 22, 1938 5 Sheets-Sheet 3
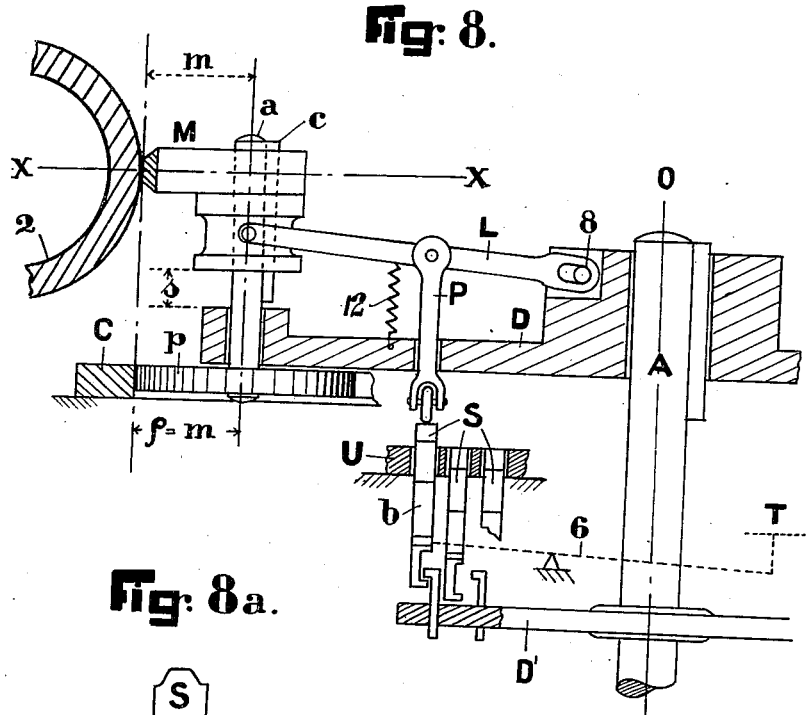
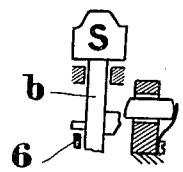
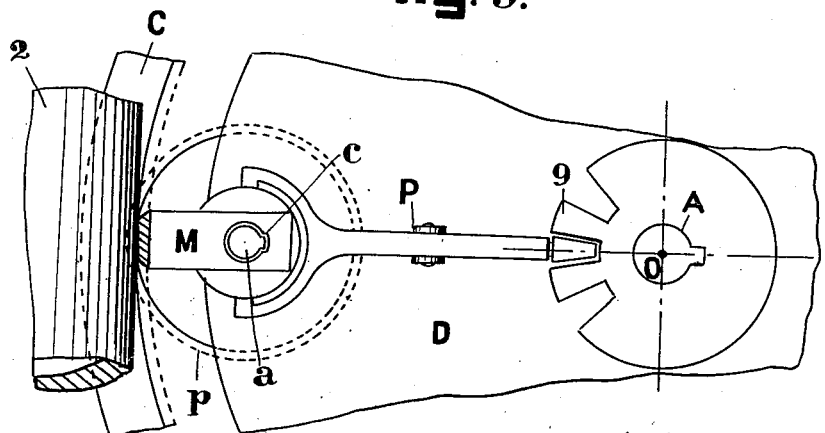
Achille Colombo
Inventor.
By Haseltine, Lake & Co.
Attorneys.

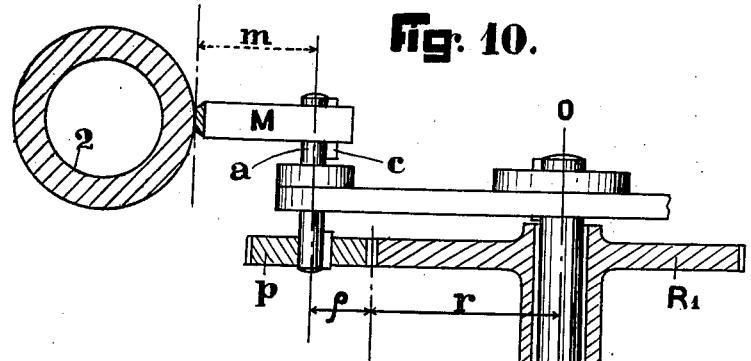
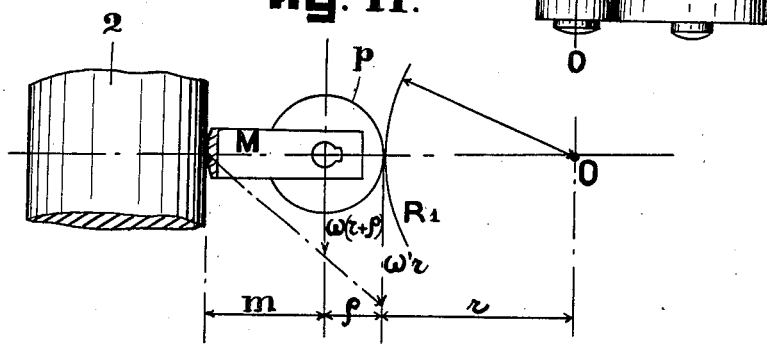
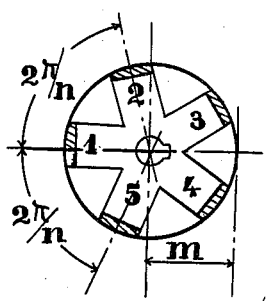
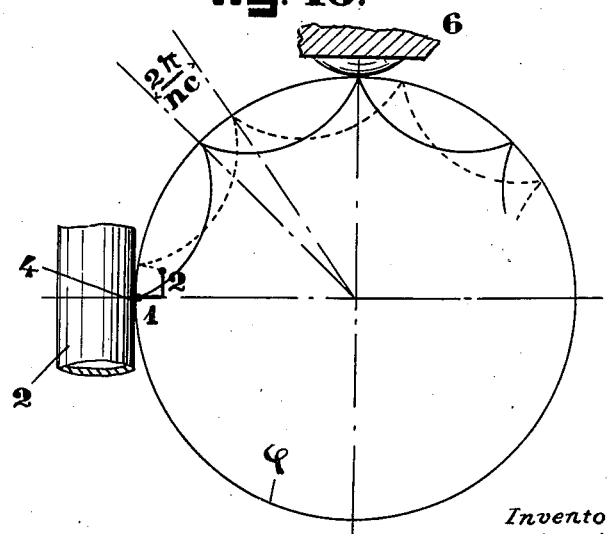

June 2, 1942.  A. COLOMBO  2,285,018

SILENT TYPEWRITING MACHINE

Filed April 22, 1938  5 Sheets-Sheet 5

Achille Colombo
Inventor

By Haseltine, Lake & Co.
Attorneys.

Patented June 2, 1942

2,285,018

UNITED STATES PATENT OFFICE 2,285,018

SILENT TYPEWRITING MACHINE

Achille Colombo, Rome, Italy

Application April 22, 1938, Serial No. 203,593
In Italy April 26, 1937

5 Claims. (Cl. 197—18)

The present invention relates to a typewriting machine and more particularly to the typing mechanism and also to several of the secondary mechanisms, which are arranged so as to obtain a silent typing due to the rolling action of the types on the paper, with a minimum effort on the part of the operator.

To obtain said result, the type is caused to follow a cycloidal path, said type being fastened on a cylindrical surface adapted to roll over, for a suitable period of time, and with the desired contact pressure, on a paper carrying cylinder. Said surface must be therefore integral with a planetary member, the rolling movement of which is produced by a driving means provided for the purpose co-operating with suitable kinematic connections, which planetary member touches the paper carrying roller only at the point of impression.

The typewriting machine according to the invention is based on the fundamental principles common to all other machines actually in use, that is to say, the uniformity, in spacing of the forward point of typing, which is obtained by the forward motion of the roller at each stroke. On this principle, the kinematic connections above mentioned, are so arranged in the construction that the fixed polar curve of the roller of any one type, is tangent to the paper carrying roller at the single typing point.

The typing devices for the typewriting machines according to the present invention provide a ready application of a continuous motive power from the outside, and their character may differ according to the type of kinematic connections used for obtaining the rolling action.

All types of machines according to the invention, have however in common the feature consisting in that the typing unit is always in movement, it being connected to a driving shaft rotating continuously in the same direction.

Some types of typewriting machines according to the invention are shown by way of example in the accompanying drawings, in which:

Figures 1 and 2 show diagrammatically the tangential contact point between the typing planet and the paper-carrying cylinder.

Figures 3 shows a planet carrying a single type, mounted eccentrically on the driving shaft of the machine.

Figure 4 shows a type unit comprising a plurality of planets each of which carries a single type.

Figure 5 shows a scheme in which a plurality of types are mounted on the same planet.

Figure 6 shows diagrammatically in elevation the kinematic elements for the transmission of the movement from a key to a planet controlled from it.

Figure 7 shows in plan the transmission arrangement shown in Fig. 6.

Figures 8 and 9 show respectively in sectional elevation and in plan one of the control devices during the impression stage.

Figures 10 and 11 show in sectional elevation and in plan an epicyclic toothed (or friction) device providing the continuous rolling movement of the type on the paper carrying roller.

Figure 12 shows in front view a star shaped type carrying pad.

Figure 13 is a diagram showing the angular amplitude of displacement on a disc of successive types at the point of contact with the roller.

Fig. 14 is a plan view of the disc, showing the extent of the radial angle by which the teeth of the rotatable comb are out of phase.

Figure 15 shows schematically in plan the rotatable comb and the key levers controlling it.

Figure 16:
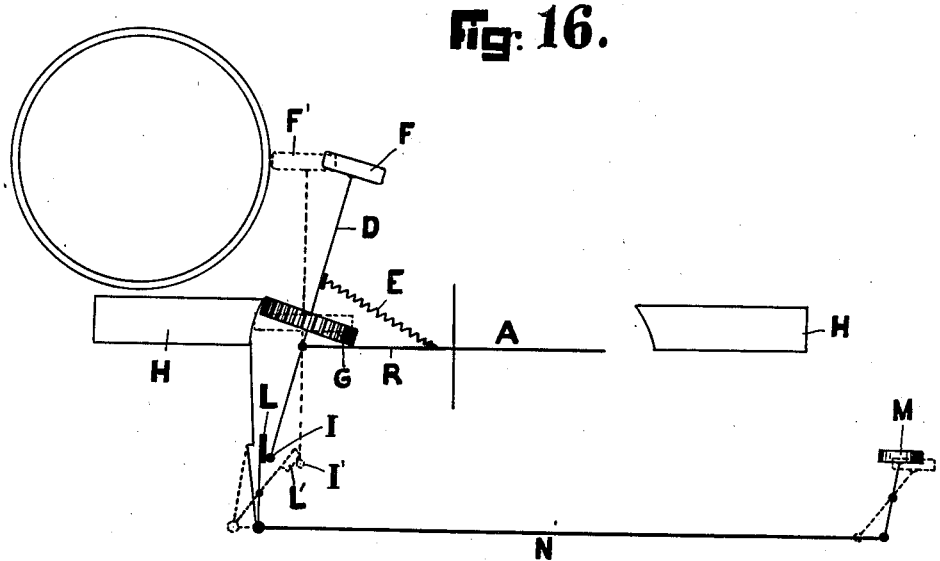
Figures 16 and 17 show schematically respectively in elevation and in plan a different form of construction of a typewriting machine, comprising a number of revolving planets each provided with a plurality of types.

The planet 3, carrying the type 5 (Figs. 2 and 3), is mounted eccentrically on the driving shaft 0 which has a constant velocity of rotation, moving continuously in a circular path. In these conditions, the type 5 carried by it follows also a circumferential path; if however the planet is caused to be rotated, the type assumes a cycloidal movement, approaching with decreasing velocity to the fixed polar point of rolling which it touches at the point 4 with zero velocity, from which point it departs with an increased velocity.

If said point of contact 4 corresponding to said fixed polar, coincides with the tangent with respect to the paper carrying roller 2, the type produces the silent impression thereon, which is the principal feature of the present invention.

Owing to the plurality of the types, their arrangement in devices of this character is made according to one of the two following methods:

(1) Each type is carried by a planet (Figs. 3 and 4).

(2) A plurality of types are carried by the same planet (Fig. 5).

A device comprising the two methods above mentioned is also possible. As shown in the figures, the planet of Method 1 (Fig. 3) defines singly in space the rolling movement adapted to bring its type to the impression point, while in the Method 2 the angular initial position of the roller varies (Fig. 5) according to the type which is intended to print.

In the first case the typing unit (Fig. 4) comprises a plurality of planets, geometrically equal to each other, mounted with the same eccentricity on the main shaft 0. Each planet carries a type 5 to which corresponds a key of the key board (or the capital and ordinary couple as obtaining in ordinary typewriters).

The action of the key on the revolving unit is here essentially the choice of the required planet and has no influence on the mechanism producing the rolling action.

The transmission of movement from a key to its planet, occurs by means of two kinematic elements (Fig. 6), one of which has as its first element the key lever 6, the other being rotatable with the same speed as the planet. The two elements form a single mechanism in case it is desired to print the type desired, only during the short period of time required for the impression. The momentary connection between each stationary element and its corresponding rotatable element is made possible by the radial dephasement of one of the rotatable elements (Fig. 7).

The above constitutes a moving unit comprising a plurality of planets and as many controlling elements.

In the second case the typing device (Fig. 5) comprises a single planet carrying a plurality of types A, B, etc. (or a relatively small number of planets as compared with the number of types).

All the keys of the key board corresponding to the types carried by the same planet have on the rotating device an essentially "differentiating" action, which means that each key must impress on the planet different rolling characteristics according to the type corresponding to it.

The differential movements are transmitted from the key to the planet by means of as many stationary elements as there are types carried by the planet, each of which causes to vary the characteristics of the coupling producing the rolling movement, or replaces one of the elements of the pair.

It is to be understood that in all types, the keys are adapted to control additional secondary operations as in all usual typewriting machines. The control device is however assisted in its action, as described with reference to the examples referred to hereinafter, as it is not employed for transmission of energy.

In the examples of construction which follow, two devices are schematically shown and described; viz:

A device with planets carrying a single type, and,

A device with planets carrying a plurality of types, as well as schemes for control transmission.

In both of these devices in which toothed connections are used, the system of maintaining the planet always in rolling movement has been selected, in order to prevent shocks due to sudden gear locking. The types are thus maintained in continuous cycloidal movement (Fig. 13) describing hypocycloidal paths.

Considering in the first place the typing mechanisms provided with geared connections or with connections by friction, Figures 6 and 7 show the arrangement of the planets and one of the connections adapted to bring them to impression. Each element or pad M, carrying a type at its end, is keyed to the shaft of a pinion $p$ rolling inside a toothed inner crown C (or rolling by friction) fixed on to the base of the machine.

As mentioned hereinbefore, the pinions and the crown are in constant mesh (Fig. 13) and the type follows continuously a cycloidal path which touches the fixed polar $\phi$ of the rolling movement a number $\tau$ of times, which is equal to the ratio of the diameters of the crown and of the pinion. One of the points of contact is used for the typing, and another is used for inking the type by means of the stationary pad 6.

The pitch cylinder of the crown is tangent to the paper carrying roller in the point 4 of the typing. However the plane $y$—$y$ in which the planets move in a circular path (Fig. 6) is lower with respect to the horizontal plane $x$—$x$ containing the tangential point, viz. the "plane of writing," so that normally, the types roll without coming in contact with the paper carrying roller.

The object of the control mechanism T—S—P—L (Fig. 6), is that of lifting, by means of the control lever, the pad M, up to the typing plane without impediment in its rolling movement transmitted to it by the pinion.

Figs. 8 and 9 show the mechanism with more details, and more particularly one of the control devices in the form assumed during the impression, viz; at the moment in which the pad M, after having been lifted through the space $s$, has passed from the common rolling plane $y$—$y$ of the planets to the typing plane $x$—$x$.

A is the principal rotating shaft, on the axis 0 of the crown C, and rotates continuously. It carries, keyed on to it, a disc or disc-sector D provided with peripheral holes, these holes being all at the same distance from the axis (or a hub provided with spokes bored at their ends). Into said holes, as many small shafts $a$ are inserted, to which the movement of rotation is transmitted by small toothed pinions (or by friction) having the same diameter, rolling on the inner side of the crown, and driven by the driving disc.

In the upper portion, each small shaft is provided with a longitudinal spigot $s$ adapted to transmit the torque movement to the pads M, permitting however their displacement along the axis of said small shaft.

The body M is such that the distance $m$ from the outer edge of the type to the axis of the small shaft is equal to the pitch radius $\phi$ of pinion $p$, so that the outer periphery of the type rolls likewise inside the pitch cylinder of the crown, and at the point of the roller which is tangent to it, the writing occurs.

Naturally, the pitch periphery of the pinion must be equal to a sub-multiple whole number of the periphery of the crown, in accordance with the ratio $\tau$ above mentioned.

The normal position of the pads M, as above mentioned, does not correspond to the height of the horizontal plane of the typing, but is somewhat below said plane.

Each type is brought to the typing plane by its control mechanism, viz. by the device L—P (which is also provided with a continuous movement of rotation) lying on a vertical plane which contains the principal axis 0 and the corresponding hole.

Each of the devices above mentioned, comprises mainly two elements: a lever L and a pecker P.

The lever L is pivoted in 8, and on the disc hub (suitably shaped for providing a seat to the pivot) or on to a circular comb 9, integral to the disc (Fig. 9). The lever L is provided at the other end with a fork F, or other similar device, adapted to lift the pad without preventing its movement of rotation.

On an intermediate point of lever L, the control spindle P is pivoted, the distance of the pivot from the main shaft varying from lever to lever. The lower ends of the spindles P, which preferably pass through disc D, describe in their movements a number of concentric circumferences having progressively increasing radii (Fig. 7).

On the vertical axial plane passing through the point of impression of the paper carrying roller, a comb U is fixed to the base of the machine (Fig. 8) which allows the vertical sliding movement of a number of small elements S corresponding to the number of pads, each being disposed at a distance from the main axis equal to that of the corresponding spindle.

By lowering a control key one of the elements S is lifted until it reaches the position adapted to lift in its turn the corresponding spindle P, which by means of the lever L carries the type on to the typing plane.

The form of the element S and the connection of the pad are adapted for maintaining the pad lifted during the "effective" rolling movement of the type on the roller element.

The contact between the spindle P and element S is maintained by means of a spring which has also the object to bring back and to maintain normally the device in the position of rest.

The eventual difficulty of constructing the device so as to obtain the tangency of the pitch cylinder to the crown, may be overcome by means of epicyclic toothed (or friction) device so as to ensure the continuous rolling movement of the type on the roller (Figs. 10 and 11).

The toothed crown is replaced by the wheel $R_1$ having a radius $r$, rotating with a velocity $w'$ which is different from the velocity $W$ of the principal shaft, on condition that:

$$\frac{w}{w'} = \frac{m}{m+1} \cdot \frac{r}{r+\phi}$$

$$\frac{m+\phi+r}{\phi} = \text{a whole number}$$

which shows that it is possible to obtain a value of $m$ which is different from the value of $\phi$ (Figs. 10 and 11).

By disposing on the pad and on the same vertical axis the ordinary and capital types of each letter, the passage from one to the other occurs from the relative vertical displacement of the roller and the rotating group, or by replacing the comb U with another comb provided with elements having different "elevations."

It is possible to operate the automatic erasure by controllably bringing the rubber to slide into the pitch cylinder of the crown (or fixed polar of the movement of rotation).

The ribbon may be replaced by a stationary pad, tangent to the pitch cylinder of the crown, in one of the points in which the types touch said cylinder during their rolling movement.

If each pad is star shaped, and has $n$ points (Fig. 12) each carrying the same letter of a different alphabetic type (or adapted to be used with a different colour) the passage from one to the other type is possible by means of a simple operation. In the type of machine comprising crown-reels, it is sufficient to rotate the crown round its own axis with respect to the stationary system roller-base, through an angular amplitude:

$$\alpha = \frac{2\pi}{n\tau}$$

for the passage from type 1 to type 2, and $$2\alpha = \frac{2(2\pi)}{n\tau}$$

for the passage from type 1 to type 3, and so on.

In the case of the gear wheel-pinion shown on Fig. 10 the operation comprises a supplementary rotation of wheel $R_1$ with respect to the principal shaft, through an angle:

$$\alpha_1 = \frac{2\pi}{n\tau}$$

for passing from type 1 to type 2 etc. . . . $r_1$ being the ratio $$\frac{r}{\phi}$$

in which $r$ is the radius of wheel $R_1$, and $\phi$ is the radius of the pinion meshing therewith.

The relation before mentioned may also be used for passing from the capital to the ordinary type, and allows the eventual reduction of the number of reels by disposing on each pad the different types of the same alphabet.

As it appears from the arrangements described above, the keyboard in front of the operator must be designed so that each key controls the lifting of one of the elements S disposed in the comb U (Fig. 8) the axis of which is placed in the axial plane passing through the point of impression.

Each element S is connected to a vertical spindle $b$ (Fig. 8) lifted vertically up by a spring system (Fig. 8a) such as to cause it, on receiving a slight impulse, to assume automatically the working position. After effecting said operation, the spindle $b$ is brought back to its original position by the same driving force giving the movement to the rotating unit, a disc D' keyed on the driving shaft A (Fig. 8) being provided with a comb U, the teeth of which, whose number is equal to the number of the elements S, have the purpose of lowering the spindles $b$. Each tooth of the comb is rotatable and is dephased in retardation with respect to the axial plane of the corresponding control device by an angle of such amplitude that the spindle $b$ may be lowered as soon as the complete impression of the type has taken place.

In Fig. 8 the disc D' is shown in profile view, and one of the two teeth shown is about to grasp the spindle $b$ to bring it back to the rest position. In Fig. 14 the same disc is shown as viewed from above so as to show the radial angular displacement of the teeth of the rotatable comb. The angular displacement $\phi$ is equal to that of the planets, while the radial displacement $n$ is equal to that of the peckers.

Fig. 15 shows schematically in plan the comb U, the elements S and the arrangement of the key levers controlling these parts. The profile view of this arrangement is shown in Fig. 6.

The devices above described clearly show that the elements of the control device operating the typing, are independent of any action of the key apart from the initial impulse imparted to it. Their operation is consequently not influenced by the eventual interruption or irregularity of control on the part of the operator, but depends essentially upon the characteristics of construction of the machine.

Figure 17:
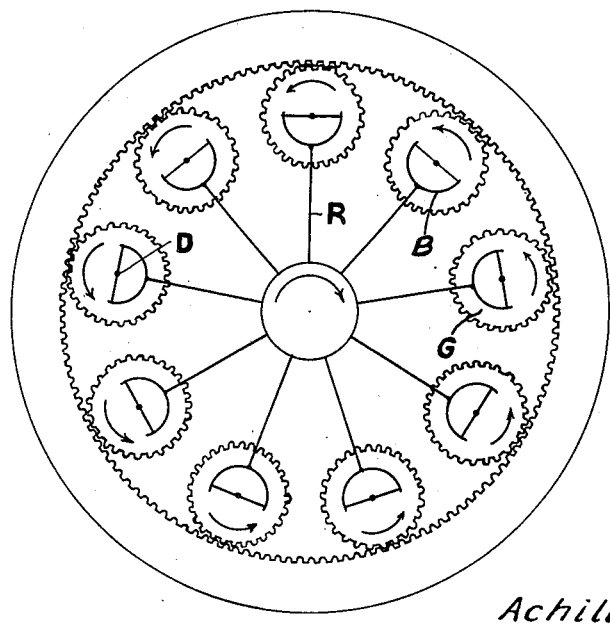

The typing by means of the rolling movement of a type-carrying pad on the paper carrying roller, may also be obtained, for example, as shown schematically respectively in elevation and in plan in Figs. 16 and 17.

In the form of construction shown in these figures, a disc or radial wheel A, is maintained in continuous rotation by means of a small electric motor. Every radial rod R of said wheel A, is provided at its outer end with a fork B, which carries attached to it with a universal coupling, the spindle D of a rotating planet. Said spindle D may also oscillate radially, and in its position of rest (non-typing position) it is held by a spring E.

To the upper end of the spindle D, is keyed the type carrier pad F having the shape of a disc or of a star, carrying at different points of its circumference a type or sign. The pad F is placed at the same height as the typing point, but is maintained at a short distance therefrom by the action of the spring E above mentioned.

The toothed wheel G is inserted near the middle of the spindle D, said wheel engaging with the crown H, and producing the rolling movement of the pad carrying the types, said pad thus becoming a planet of the rotating disc or radial wheel. The toothed crown H has a curved profile, the curvature having a radius equal to that of toothed wheel G, so as to ensure its engagement when the planet passes from its position of rest to the typing position, by means of the radial oscillations above mentioned, as hereinafter described.

To the other end of the spindle, there is keyed a disc I, adapted to roll on the circular sector shaped guide L, when this latter is displaced by the action of the key as hereinafter described.

On the supposition that the machine carries eight planets, each carrying in its turn ten letters or signs, there are eighty types altogether, which are sufficient in any typewriting machine.

In this case the spindles have eight different lengths, and the respective discs I rotate in eight different planes. In correspondence with each disc, there is a guide L adapted to be shifted by a key from L to L', producing the corresponding displacement of pad F to the position F', thus approaching the type to the position on the tangential point of contact between the planet and the paper carrying roller, said point of contact corresponding to the point of typing. The guide L is a circular sector, slightly bell shaped throughout, in order to prevent the sharp passages of the disc rolling over it. From the selection of one or the other of the eight guides, the planet corresponding to it is actuated for the typing. A suitable common system of levers is provided for controlling from key M the slight displacement of the corresponding guide L.

The selection of one of the ten types carried by the planet, viz. of one of the ten points carried by pad F, to be brought in contact with the paper, is operated by rotating in one or the other direction the toothed crown with respect to the stationary system roll-base, through an angle corresponding to the type to be written.

The said ten displacements may be subdivided into two groups of five each, one of which being assigned to ordinary letters or signs, the other to capital letters, the passage from one group to the other being operated with a supplementary key as in typewriting machines now used. Within each of said groups, the displacements are controlled by a key, that is to say the same key will control lever N which operates both the guide L and the crown H. This latter must be caused to assume five different positions, the central one of which being the position of rest, so that the displacements are limited to two on each side. Thus lever N, through its action on the toothed crown, has only to hook one or two teeth at the right or at the left hand side, as obtaining in an ordinary typewriting machine, for changing the line spacing by rotating the paper carrying roller through one, two or three teeth.

It is to be observed that the path followed both by the guide L and by the crown H is very short, while the effort required for moving these elements is very slight, as they are not subjected to any appreciable friction. Thus only a slight touch of the key is sufficient to operate the two aforesaid movements, while the work required to move the other mechanisms of the machine is provided by the small motor. The device described above is well adapted to substitute for the levers a pneumatic control of the type such as used in piano players, in which case the function of the keys is that of opening or closing the various air conduits.

With the typewriting machine above described, it is possible to produce two or more copies without using carbon paper. In order to do this, it will be necessary to reverse the relative position of the paper roller and the typing pad, by rotating this latter, viz. the planet wheel, round an axis parallel to or nearly parallel to the axis of the paper carrying roller. It will thus be possible to arrange two or more paper-carrying rollers, so that the typing is repeated at each revolution of the planet. The distance between the typing points will be equal to the length of the circumference of the planet, and as this latter may be of small size, it will be possible to provide a number of said paper carrying rollers so as to obtain simultaneously a plurality of original type of the same text.

As mentioned hereinbefore, the axis of rotation of the rotating unit is parallel or nearly parallel to the axes of the paper-carrying roller or rollers. In fact the space occupied by the toothed crown, may prevent obtaining perfect parallelism between said axes, so that a certain amount of obliquity may be unavoidable; in such case it is possible however to correct said obliquity by assigning a conical shape to the typing pad, the generatrix line of the cone being such as to be parallel to that of the paper carrying roller at the point of contact.

The typewriting machine described with reference to Figs. 16 and 17, allows a number of different arrangements and operations of the key board.

A first arrangement consists in providing a key board perfectly similar to those now commonly used, comprising about forty keys, each of which controls two letters (ordinary and capital) or two signs. The passage from one to the other is operated, as above mentioned, by a supplementary key.

A second arrangement, which permits to reduce down to eighteen the number of keys, is the following: Nine planets are provided, each carrying nine types, so that nine guides L and nine displacements of the crown are required, each of which is individually controlled by a key. This arrangement results in two groups each comprising nine keys, one of said groups being conveniently controlled by the left hand, and the other by the right hand, two keys being always lowered at a time. The typing is in this case produced by lowering simultaneously two keys, which at first sight may appear to be inconvenient, owing to the fact that two fingers of the operator are engaged simultaneously instead of only one, so that a longer practice will be required in order to be familiar with the combinations of the nine keys of a group with the nine keys of the other group. Once however, the operator has learned this new kind of alphabet, his speed may become considerably greater than is possible with the typewriters now being used, because his fingers are always ready for the work, as they rest on the five keys being mostly used, instead of jumping from one key to the other.

The construction of the machine, when this last arrangement is adopted is greatly simplified.

I claim:

1. In a silent typewriting machine, in combination with a paper-carrying roller: a driving shaft rotating continuously in one direction, a wheel keyed to said shaft, a sun gear coaxial with said shaft, a plurality of planetary pinions carried at the periphery of said wheel and in constant mesh relationship to said sun gear, a plurality of type-carrying pads, each associated with one of said planetary pinions and thereby driven with a continuous planetary motion, said pads being shiftable with respect to said paper-carrying roller between an inoperative position and a writing position, key-controlled means for shifting said pads into the writing position, and means for automatically returning said pads to the inoperative position.

2. In a silent typewriting machine, in combination with a paper-carrying roller: a driving shaft rotating continuously in one direction, a wheel keyed to said shaft, a sun gear coaxial with said shaft, a plurality of planetary pinions carried at the periphery of said wheel and in constant mesh relationship to said sun gear, a plurality of type-carrying pads, each associated with one of said planetary pinions and thereby driven with a continuous planetary motion, said pads being shiftable with respect to said paper-carrying roller between an inoperative position and a writing position; the assembled relationship of the planetary pinions to the sun gear being such that a type on each type-carrying pad in the writing position comes in contact with the paper-carrying roller at one of the outermost points of the planetary trajectory of the type, and that said type has a motion perpendicular to the paper-carrying roller in the vicinity thereof; key-controlled means for shifting said pads into the writing position, and means for automatically returning said pads to the inoperative position.

3. In a silent typewriting machine of the type having a paper-carrying roller, the feature comprising a plurality of type-carrying pads, external driving means for effecting a continuous circular movement of said pads, consisting of a driving shaft, rotating continuously in one direction only, a disc keyed on said driving shaft, planetary members provided with teeth carried at the periphery of said disc, each of said pads being associated with a planetary member, an inner toothed crown co-axial with said driving shaft and in meshing relation with said planetary members, each pad being slidably connected with each said planetary member, and key-controlled means adapted to effect sliding movement of the pads from an idle plane to the writing plane of the machine.

4. Silent typewriting machine according to claim 3, wherein the key-controlled means adapted to effect sliding movement of the pads from an idle plane to the writing plane of the machine comprise radially articulated levers independently controlling the sliding of the pads, each of said levers being articulated on the hub of the disc carried by the driving shaft, a plurality of radially arranged shaped members, guides for said shaped members, keys adapted to move slidably said shaped members, and a plurality of peckers controlling the oscillation of said levers, each of said shaped members having a curved profile in elevation and sliding vertically in one of said guides and being controlled by a key, so as to cause operation of the corresponding pecker.

5. Silent typewriting machine comprising articulated levers, a plurality of type-carrying pads adapted to be lifted from an idle plane to the writing plane of the machine, said levers controlling independently the lifting of the pads, a main shaft for said levers, a plurality of keys, a hub keyed on the driving shaft on to which said levers are articulated, a suitably shaped member slidable in guides, vertically controlled by each of said keys, a plurality of peckers controlled by said shaped members, each pecker being pivoted to one of said articulated levers intermediate its ends, a spring device applied at a convenient point, to aid in lifting vertically each shaped member, and a rotating comb for controlling the descending movement of each of said shaped members, said comb being provided with staggered teeth and driven by said driving shaft, each tooth of the comb being staggered by an amount corresponding to the position of the shaped members and in retardation with respect to the corresponding pad.

ACHILLE COLOMBO.